(12) United States Patent
Findlay et al.

(10) Patent No.: US 7,304,576 B2
(45) Date of Patent: Dec. 4, 2007

(54) REFURBISHING AND RESALE TECHNIQUES FOR DATA STORAGE TAPE

(75) Inventors: Brian D. Findlay, Woodbury, MN (US); Denis J. Langlois, River Falls, WI (US)

(73) Assignee: Imation Corp., Oakdale, MN (US)

( * ) Notice: Subject to any disclaimer, the term of this patent is extended or adjusted under 35 U.S.C. 154(b) by 216 days.

(21) Appl. No.: 11/255,666

(22) Filed: Oct. 20, 2005

(65) Prior Publication Data
US 2007/0094058 A1    Apr. 26, 2007

(51) Int. Cl.
*G08B 13/14* (2006.01)
(52) U.S. Cl. ............... 340/572.1; 340/572.4; 702/187; 360/31
(58) Field of Classification Search ............ 340/572.1, 340/572.8, 309.16, 572.4, 514; 235/376; 369/19, 13.03; 360/31, 69, 134, 135; 702/179, 702/182, 187
See application file for complete search history.

(56) References Cited
U.S. PATENT DOCUMENTS 5,819,100 A * 10/1998 Pearce ........................ 713/323
6,385,557 B1 * 5/2002 Mundo et al. ............... 702/179
6,707,630 B2 * 3/2004 Doi et al. ...................... 360/69

OTHER PUBLICATIONS

"Graham Media Products and Equipment," http://www.graham-magnetics.com/mediaProducts.html, 3 pages, printed Jan. 12, 2006.
"Graham Recertified 3590and 3590e," www.grahammagnetics.com, 2 pages, 2004.
"Graham Recertified 9840 and 9940," www.grahammagnetics.com, 2 pages, 2004.

* cited by examiner

*Primary Examiner*—Toan N. Pham
(74) *Attorney, Agent, or Firm*—Eric D. Levinson

(57) ABSTRACT

Techniques are described for reselling and/or refurbishing data tape media. The techniques may involve determining life information associated with a data tape medium and reselling the data tape medium when a remaining life of the data tape medium is larger than a pre-defined threshold. In this manner, the quality of resold magnetic tape can be improved, and the media can possibly marketed or warranted to the buyer based on the remaining life. In addition, refurbishing techniques are described that include degaussing of servo written data tape media, followed by the creation of new servo patterns on the degaussed media.

14 Claims, 6 Drawing Sheets

REFURBISHING AND RESALE TECHNIQUES FOR DATA STORAGE TAPE

TECHNICAL FIELD

The invention relates to data storage tape, such as magnetic tape and, more particularly, techniques that can improve the refurbishing and resale of magnetic tape cartridges.

BACKGROUND

Magnetic tape remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic tape, data is typically stored as magnetic signals that are magnetically recorded on the tape surface. The data is typically organized along "data tracks," and transducer heads are positioned relative to the data tracks to write data to the tracks or read data from the tracks. Magnetic tape typically includes several data tracks in a data band. Other tape media, such as optical tape, holographic tape, and other tape media formats can also make use of data tracks. Tape media has the advantage of a very large surface area relative to disk-shaped media.

Servo patterns refer to signals or other recorded marks on the medium that are used for tracking purposes. In other words, servo patterns are recorded on the medium to provide reference points relative to data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data to the data tracks.

In a magnetic tape medium, servo patterns are often stored in specialized tracks on the medium, called "servo tracks." Servo tracks serve as references for the servo controller. Servo tracks typically hold no data except for information that is useful to the servo controller to identify positioning of a transducer head relative to the surface of the medium. A plurality of servo tracks may be defined in a servo band. Some magnetic tape media include a plurality of servo bands, with data tracks being located between the servo bands.

Servo patterns are referred to as pre-recorded when they are recorded during the fabrication of the media. In other words, pre-recorded servo patterns are servo patterns recorded in the media prior to the media being used for storage of data. These pre-recorded servo patterns allow the media to achieve higher storage densities because the servo patterns enable positions on the media to be located with greater precision. Therefore, servo patterns allow for smaller amounts of media surface to be used to store units of data.

One example of pre-recorded servo patterns are amplitude-based servo patterns. For amplitude-based servo patterns, the detection of the servo signal amplitude enables identification of head positioning relative to the servo track. Another example of pre-recorded servo patterns are time-based servo patterns. For time-based servo patterns, the timing of the detection of successive servo marks enables identification of head positioning relative to the servo track. Other types of servo patterns also exist. Moreover, in some cases, servo patterns may be interspersed within data tracks.

Recently, a market for refurbished magnetic tape has emerged. Specifically, resellers may purchase or obtain used magnetic tape cartridges, repackage the tape cartridges, and sell the tape cartridges as refurbished media, typically at a discounted price relative to new tape cartridges. For magnetic tape that does not include servo patterns, the tape is typically degaussed in order to erase data content from the tape. For magnetic tape that includes servo patterns, however, degaussing is typically avoided. In this case, resellers typically use a drive to overwrite the data tracks in an effort to erase any data content prior to resale. Many companies claim that the used data storage cartridges are "recertified" in order to promote brand quality associated with the resale of such media.

SUMMARY

In general, the invention is directed to techniques for reselling and/or refurbishing data tape media. The techniques may involve determining life information associated with a data tape medium and reselling the data tape medium only when a remaining life of the data tape medium is larger than a pre-defined threshold. In other words, resale of data tape media having a remaining life that is less than the pre-defined threshold can be specifically avoided. In this manner, the quality of resold magnetic tape can be improved, and the media can possibly be marketed or warranted to the buyer based on the remaining life.

In some cases, the magnetic tape media is also refurbished. In particular, this disclosure also contemplates specific types of refurbishing techniques that can improve the quality of resold media, and limit the ability to retrieve data that may have been previously recorded on the data storage tape. The techniques may include degaussing magnetic tape that was formerly recorded with servo patterns to remove all data and the servo patterns. The techniques may further include writing new servo patterns on the degaussed magnetic tape using in-drive servo recording techniques.

The invention may also exploit tape monitoring and recording techniques commonly used in the field of magnetic tape in order to determine life information associated with such magnetic tape. For example, magnetic tape often includes a header file and/or a radio frequency identification (RFID) tag that is periodically updated by tape drives to maintain life information. In these cases, the life information may comprise a counter file that is maintained on the tape (or in an RFID tag within a tape cartridge). The counter file defines how much use the tape has been subjected to, and may have meaning relative to a useful life product specification. The techniques described herein may exploit this life information that is maintained in a header file or RFID tag associated with the magnetic tape, and allow for resale or refurbishing only when the remaining useful life exceeds a predefined threshold. Resold tape media may also be priced based on how much useful life remains, or warranted based on the life information.

In one embodiment, the invention provides a method comprising determining life information associated with a data tape medium, and reselling the data tape medium when the life information indicates that the data tape medium has a remaining life that is larger than a pre-defined threshold.

In another embodiment, the invention provides a method of refurbishing a data tape cartridge that comprises a data tape medium including a servo pattern and data that has been recorded on the data tape medium. The method comprises degaussing the data tape medium, and recording a servo pattern on the degaussed data tape medium.

In another embodiment, the invention provides a method comprising determining life information associated with a data tape medium in a data tape cartage, and refurbishing the data tape medium when a remaining life of the data tape medium is larger than a pre-defined threshold. The method may further comprise reselling the data tape cartridge that includes the refurbished data tape medium.

The techniques described herein may provide a number of advantages. For example, by exploiting life information, e.g., that is either stored in the header of magnetic tape or in another place, such as an RFID tag, the resale of poor quality media can be avoided. In this manner, the quality of resold magnetic tape can be improved, and possibly warranted to the buyer. The purchase price may also reflect the remaining useful life of the magnetic tape, and marketing techniques based on the remaining useful life determined by the life information can assure buyers of the quality of the resold media.

Furthermore, the refurbishing techniques described herein may further improve the quality of refurbished media, and limit the ability to retrieve data that may have been previously recorded on the data tape medium. This may be particularly important if the resold media previously included sensitive information. By degaussing magnetic tape that was formerly recorded with servo patterns, data removal can be improved for such media relative to conventional overwrite techniques that apply only to the data tracks. The techniques used herein can provide for the re-writing of new servo patterns on the degaussed magnetic tape, e.g., using in-drive servo recording.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
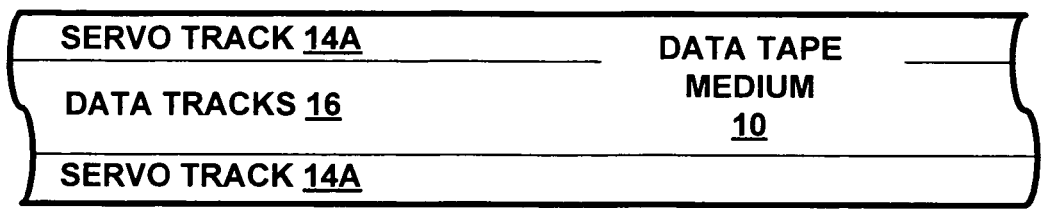
FIG. 1 is a depiction of a magnetic tape that can be refurbished and/or resold according to the techniques described herein.

FIG. 1 is a conceptual diagram of a data tape medium 10 that can be refurbished and/or resold according to the techniques described herein. Data tape medium 10 comprises a linear medium, such as magnetic tape. Data tape medium 10 typically comprises a substrate with one or more layers of magnetic particles dispersed or coated on one or both sides of medium. Data tape medium 10 may be housed in a tape cartridge, although some embodiments are not necessarily limited in this respect.

Conventional magnetic tape refurbishing techniques are generally different depending on whether the magnetic tape includes servo patterns or not. For magnetic tape that does not include servo patterns, conventional refurbishing typically degausses the tape in order to erase all data content from the tape. For magnetic tape that includes servo patterns, however, degaussing is avoided. In this case, resellers typically use a drive to overwrite the data tracks in effort to erase any data content prior to resale. Unfortunately, overwriting of data tracks does not necessarily remove the old data, and the old data may still be recoverable following an overwrite. This is highly undesirable for refurbished media.

In one aspect of the invention, refurbishing techniques include the degaussing of data tape medium 10 that includes one or more servo tracks 14A and 14B (collectively servo tracks 14) and one or more data tracks 16. This can better ensure that the old data is erased from data tape medium 10 and can reduce the likelihood that old data can be recovered from the refurbished media. However, this also requires servo patterns to be re-written on the refurbished media since degaussing removes the servo patterns.

For such refurbishing that includes the re-write of servo patterns, the invention contemplates "in-drive" servo writing. In-drive servo writing comprises a process in which a data cartridge (not shown in FIG. 1) is inserted into a tape drive. The servo patterns are then written by the tape drive in a manner similar to conventional data recording. The heads within the drive, in this case, are designed for such in-drive servo writing. The head design for such servo writing would vary depending on what type of servo pattern is being written. For example, heads for the creation of time-based servo marks or heads for the creation of amplitude-based servo windows could be used.

In-drive servo writing is different from conventional servo writing used in the initial creation of the data tape medium. In particular, the servo writing during the initial creation of the data tape medium typically occurs with respect to a large roll of magnetic tape (commonly referred to as a tape pancake), such that the servo patterns exist on the medium prior to the medium being loaded into a cartridge. In contrast, in-drive servo writing occurs with respect to tape that is located in a cartridge when the cartridge is loaded into a drive.

Another aspect of the invention relates to the resale of data tape media. The resale techniques described herein may be particularly useful with the refurbishing techniques described herein, but may also be used with respect to non-refurbished media. The resale techniques may involve determining life information associated with a data tape medium and reselling the data tape medium only when a remaining life of the data tape medium is larger than a pre-defined threshold. In other words, resale of data tape media having a remaining life that is less than the pre-defined threshold can be specifically avoided. In this manner, the quality of resold magnetic tape cartridges can be improved, and the data tape cartridges may possibly be warranted to the buyer based on the remaining life. Marketing can also be based on the remaining life.

The resale techniques can exploit the fact that many types of magnetic tape media include life information with the medium. Thus, the life information can be read and the compared to a product specification that specifies the life of the data tape medium. Only those media that have substantial life remaining, as defined by the life information relative to the product specification for that product may be resold (or refurbished and resold).

For example, magnetic tape often includes a header file and/or a radio frequency identification (RFID) tag that is periodically updated by a tape drive to maintain life information. In these cases, the life information may comprise a counter file that is maintained on the tape (or in an RFID tag). The counter file defines how much use the tape has been subjected to, and may have meaning relative to a useful life product specification. The techniques described herein may exploit this life information that is maintained in a header file or RFID tag associated with the magnetic tape, and allow for resale or refurbishing only when the remaining useful life is substantial.

Figure 2:
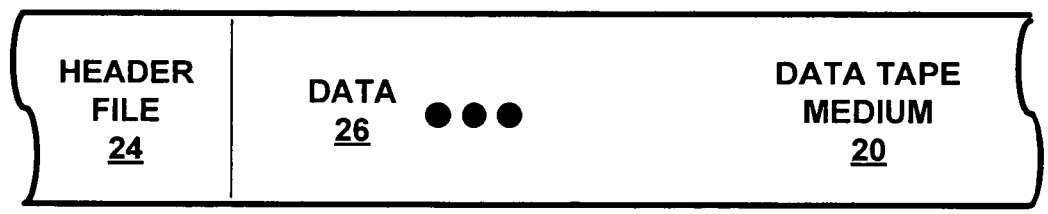
FIG. 2 is another depiction of a magnetic tape that can be refurbished and/or resold according to the techniques described herein.

FIG. 2 is a conceptual diagram of a data tape medium 20 that can be resold according to the techniques described herein. Data tape medium 20 comprises a linear medium, such as magnetic tape. Data tape medium 20 typically comprises a substrate with one or more layers of magnetic particles dispersed or coated on one or both sides of medium. Data tape medium 20 may be housed in a tape cartridge, although some embodiments of the invention are not necessarily limited in this respect.

As shown in FIG. 2, data tape medium 20 includes a header file 24 and various data files (DATA) 26. Header file 24 and DATA 26 are both magnetically recorded information on the surface of data tape medium 20. Header file 24 maintains life information, e.g., a counter that is incremented every time operations are performed on data tape medium 20. Header file 24 may be a located at the beginning of a length of data storage tape, but more generally refers to any file than includes the life information associated with data storage tape 20 as outlined herein. In this sense, header file 20 may also be referred to as, more generally, a life information file that can be located anywhere on the surface of the magnetic tape.

Data tape medium 20 may include a product specification that defines a "shelf life" of medium 20. By comparing this shelf life in the product specification with header file 24, a remaining useful life of data tape medium 20 can be determined. As one example, the shelf life of medium 20 may be limited to 10,000 read/write passes of data tape medium, or 200 full file write operations. In these examples, header file 24 can maintain an ongoing count of the number of read/write passes and full file write operations that have been performed. The number of read/write passes or full file write operations are examples of types of values referred to herein as manufacturer specified durability values. Other manufacturer specified durability values, however, could alternatively be used to facilitate the useful life determinations.

In accordance with the invention, a threshold can be defined relative to one or more aspects of the product specification. For example, the threshold may be defined as an absolute number of read/write passes or full file write operations, or possibly as percentages of the shelf life defined in the product specification. For example, the threshold may be approximately 50 percent of an original manufacture specified durability value. However, any other percentage or absolute numbers may be used to define the threshold for other implementations. In general, the threshold defines how much remaining life is acceptable to allow the data storage tape to be resold and/or refurbished. If data tape medium 20 has a remaining life that is less than the threshold, it may be discarded and not resold or refurbished. In other words, data tape medium 20 may be resold only when the remaining life of data tape medium 20 is larger than the pre-defined threshold. In this manner, the quality of resold magnetic tape can be improved, and possibly warranted to the buyer.

The purchase price may also reflect the remaining useful life of the data storage tape, and marketing techniques based on the remaining useful life determined by the life information stored in header file 24 can be used to assure buyers of the quality of the resold data storage tape. For example, reselling a data tape cartridge that includes medium 20 may include marketing the data tape cartridge as defining a remaining useful life greater than the pre-defined threshold. Furthermore, reselling a data tape cartridge may include warranting the cartridge for an amount of time substantially equal to the pre-defined threshold.

Figure 3:
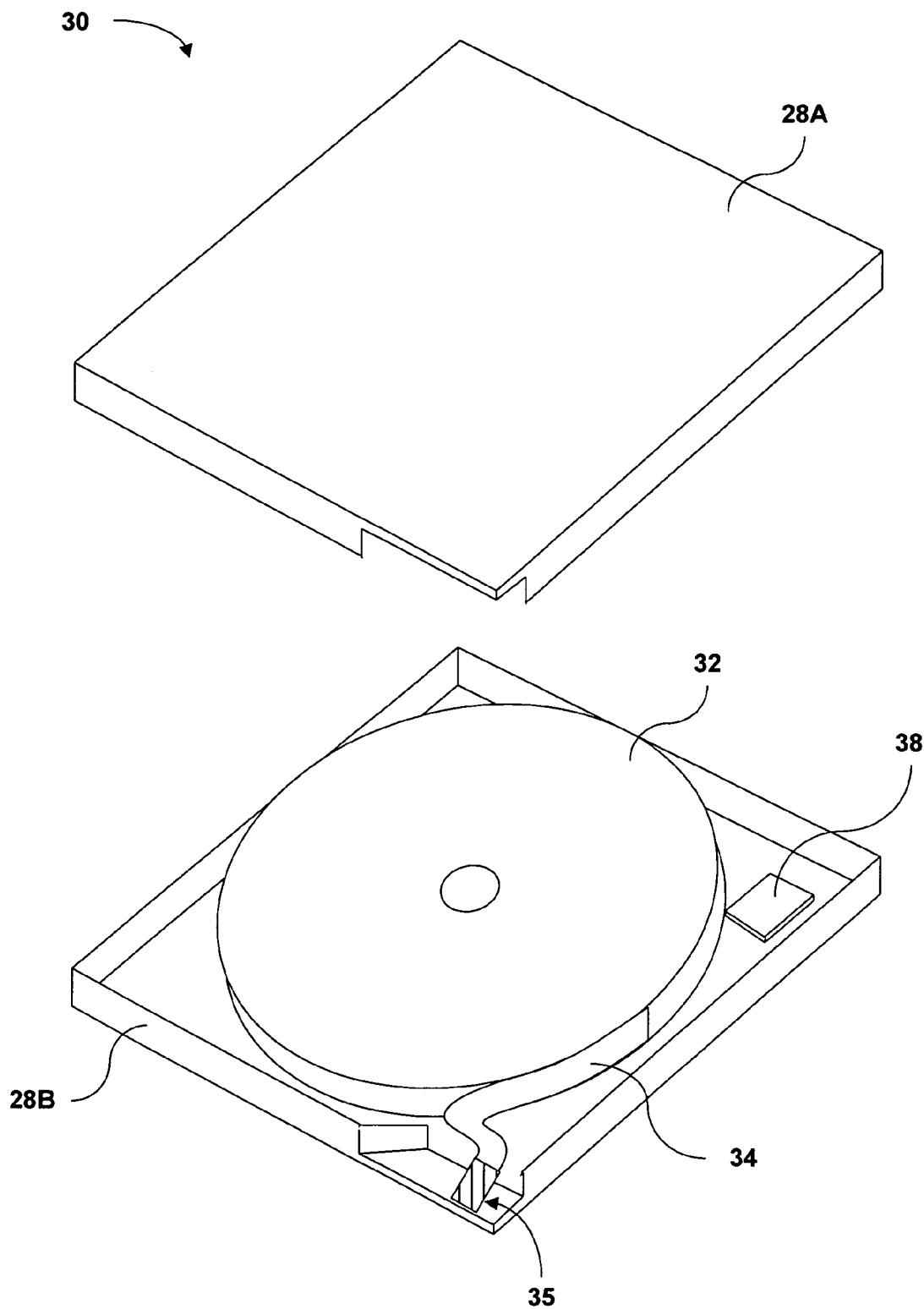
FIG. 3 is an exploded perspective depiction of a magnetic tape cartridge that can be refurbished and/or resold according to the techniques described herein.

FIG. 3 is an exploded perspective depiction of a magnetic tape cartridge 30 that can be resold (or refurbished and resold) according to the techniques described herein. As shown, magnetic tape cartridge 30 includes a housing 28A and 28B (collectively housing 28) that houses a reel of magnetic tape 32. Magnetic tape 32 may include a leader 35 to allow a drive mechanism to pull magnetic tape 32 through the drive, although the invention is not limited to any tape cartridge configuration. In other configurations, for example, a magnetic tape cartridge may include two separate reels with the tape being accessible through the housing as it travels from reel to reel.

An initial portion 34 of magnetic tape 32 may include a header file, similar to that outlined above with respect to FIG. 2. In particular, initial portion 34 of magnetic tape 32 may include a file that maintains the life information that facilitates the ability to assess whether or not to resell or refurbish magnetic tape cartridge 30, as outlined herein.

Additionally or alternatively, magnetic tape cartridge 30 may include a storage element 38, such as a radio frequency identification (RFID) tag that stores the life information. Again, the life information may be stored in a counter file that is incremented by a drive-in order to maintain a count of the amount of use of magnetic tape cartridge 30. Examples of life information include the number of read/write passes performed on magnetic tape 32 or the number of full file write operations performed on magnetic tape 32. However, other types of life information that records the past use of magnetic tape 32 could be used according to the techniques described herein. The techniques set a threshold that establishes how much useful life is acceptable for a data tape medium in a resale environment, and then disallow the resale or refurbishing of magnetic tape cartridge 30 when the remaining life of magnetic tape 32 is below the threshold.

Figure 4:
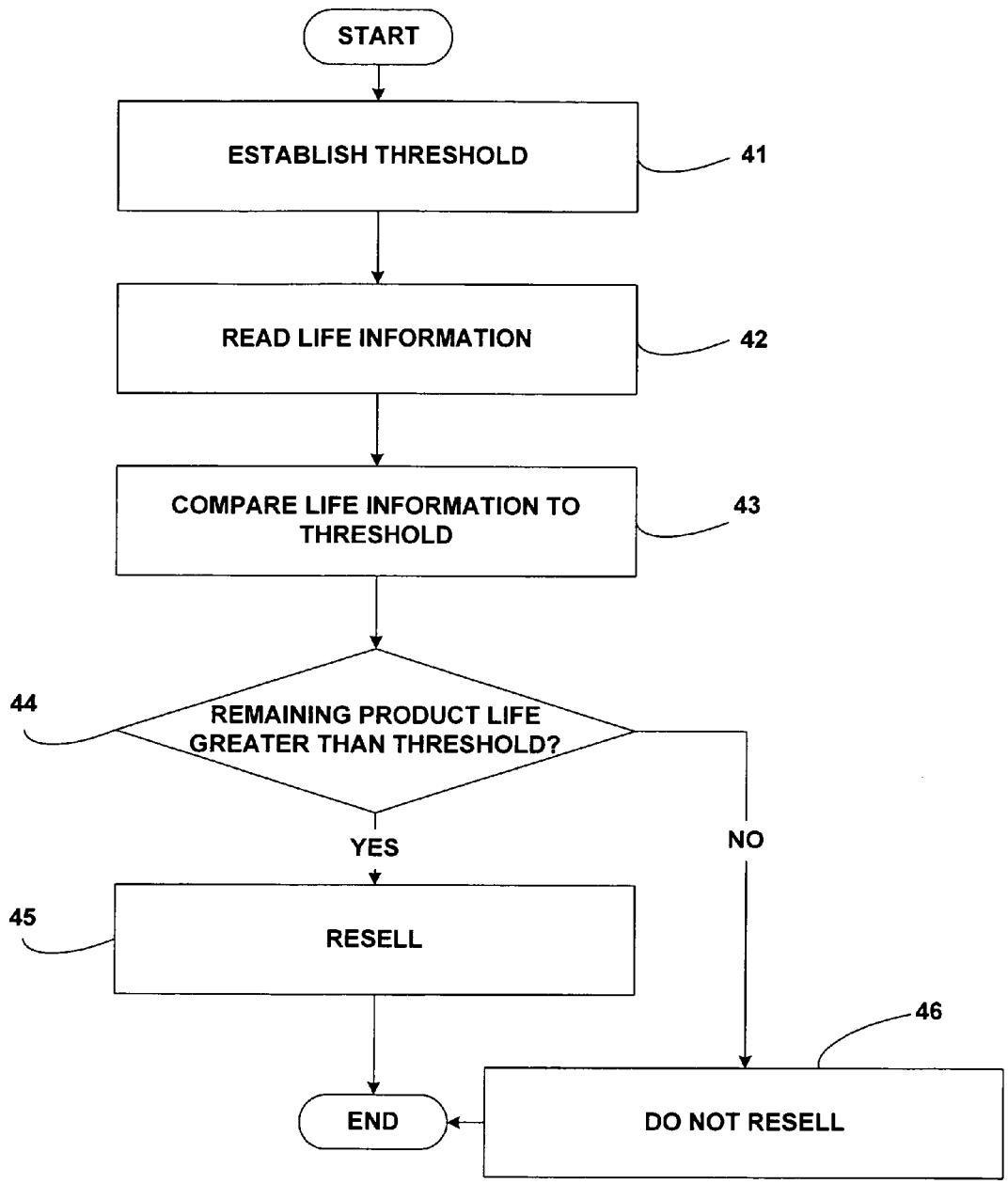
FIG. 4 is a flow diagram illustrating a technique for determining whether or not to refurbish magnetic tape according to an embodiment of the invention.

FIG. 4 is a flow diagram illustrating a technique for determining whether or not to resell magnetic tape according to an embodiment of the invention. FIG. 4 will be explained with reference to media 20 and 30 of FIGS. 2 and 3. As shown in FIG. 4, a threshold is established (41). Again, the threshold defines how much useful life is acceptable for data tape medium 20 or data tape cartridge 30 in a resale environment. Life information is then read from data tape medium 20 or data tape cartridge 30 (42). For example, the life information may be maintained in a file on data tape medium 20 or in a storage element 38 of data tape cartridge 30. The stored life information is then compared to the threshold (43).

If the remaining product life of data tape medium 20 or data tape cartridge 30 is greater than the threshold (yes branch of 44), data tape medium 20 or data tape cartridge 30 is resold. However, if the remaining product life of data tape medium 20 or data tape cartridge 30 is not greater than the threshold (no branch of 44), the product is not resold. In this manner, the threshold allows for a quality check based on remaining product life according to the product specification. In some cases, the pricing of the resold media may be linearly related to the remaining life of the media, as defined by the life information that is identified from the media.

Figure 5:
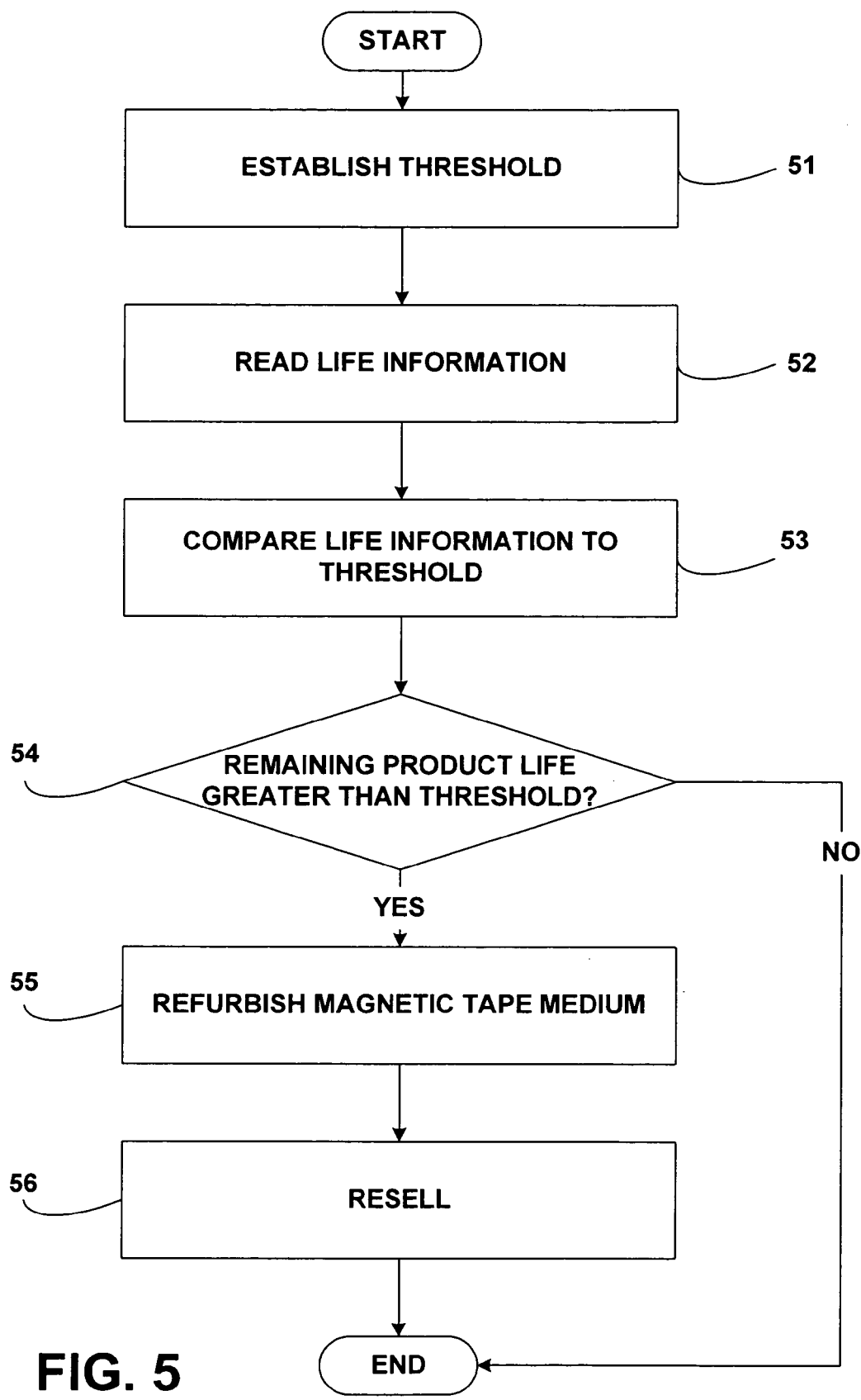
FIG. 5 is a flow diagram illustrating a technique for determining whether or not to refurbish magnetic tape according to an embodiment of the invention.

FIG. 5 is a flow diagram illustrating a technique for determining whether or not to refurbish magnetic tape according to an embodiment of the invention. FIG. 5 is very similar to FIG. 4, but further concerns the decision whether to refurbish the magnetic tape. As shown in FIG. 5, a threshold is established (51), which defines how much useful life is acceptable for data tape medium 20 or data tape cartridge 30 in a resale environment. Life information is then read from data tape medium 20 or data tape cartridge 30 (52), and compared to the threshold (53). If the remaining product life of data tape medium 20 or data tape cartridge 30 is greater than the threshold (yes branch of 56), data tape medium 20 or magnetic tape 32 is refurbished (55) and resold (56). If not, refurbishing and resale are avoided for the product, and the product may be discarded.

Figure 6:
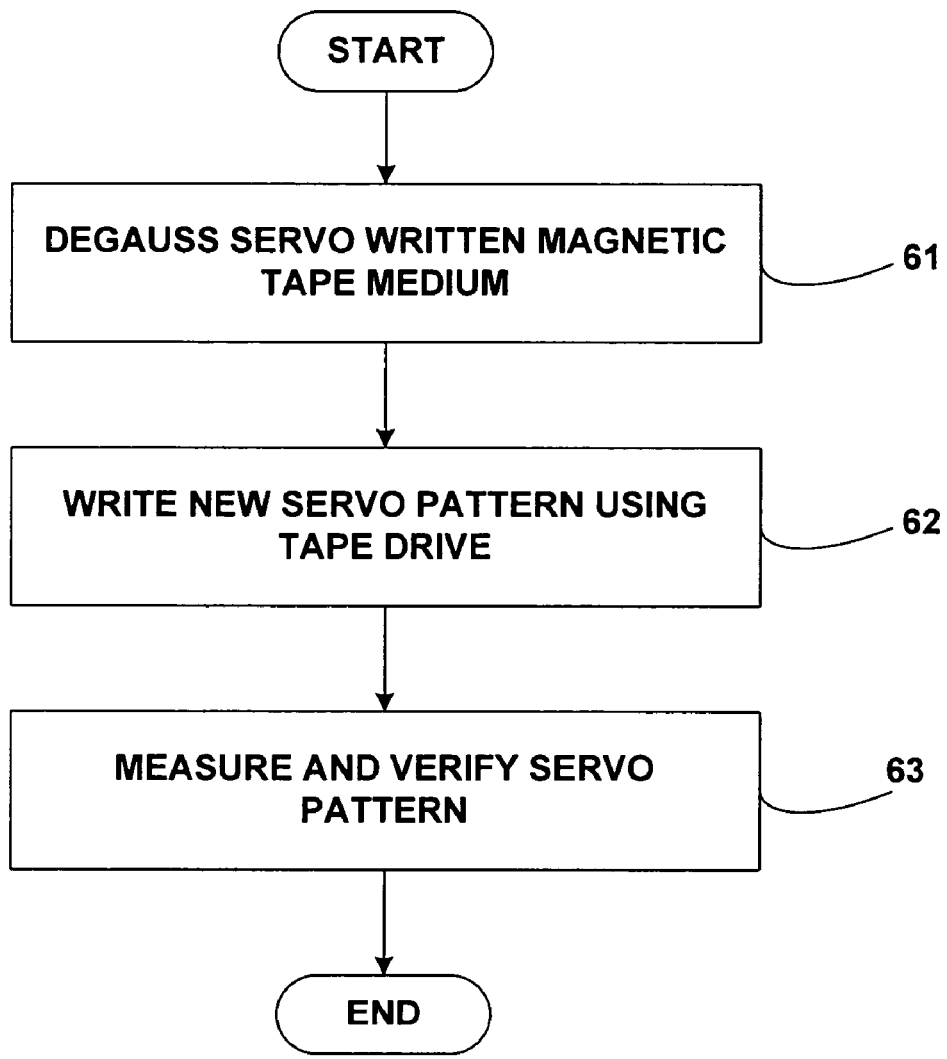
FIG. 6 is a flow diagram illustrating a technique for refurbishing magnetic tape according to an embodiment of the invention.

FIG. 6 is a flow diagram illustrating a technique for refurbishing magnetic tape according to an embodiment of the invention. FIG. 6 will be described in the context of data tape medium 10 of FIG. 1. In this example, it should be assumed that data tape medium 10 is housed within a tape cartridge (not shown in FIG. 1). As shown in FIG. 1, data tape medium 10 comprises a servo written medium insofar as it includes one or more servo patterns. In particular, data tape medium 10 includes servo tracks 14 that include magnetically written servo patterns that were pre-formed on data storage medium 10 prior to placement of medium 10 within the cartridge. The servo marks within servo tracks 14 may have a variety of formats and may include amplitude-based marks, time-based marks, or both.

In order to refurbish data tape medium 10, degaussing is performed (61). This is different than conventional refurbishing of servo written media insofar as conventional techniques simply perform an overwrite of data tracks 16 but not servo tracks 14. Degaussing is advantageous as it improves data removal relative to an overwrite, but complicates the process insofar as degaussing data tape medium 10 erases the servo marks within servo tracks 14.

After degaussing is performed, a new servo pattern is written into servo tracks 14 using a tape drive (62). In this case, data storage tape 10 is not removed from its cartridge. Rather the cartridge is inserted into a drive that includes heads designed for servo writing. The newly written servo marks can then be measured and verified (63) in order to test the quality of data storage tape 10, which is a refurbished product at this point.

Figure 7:
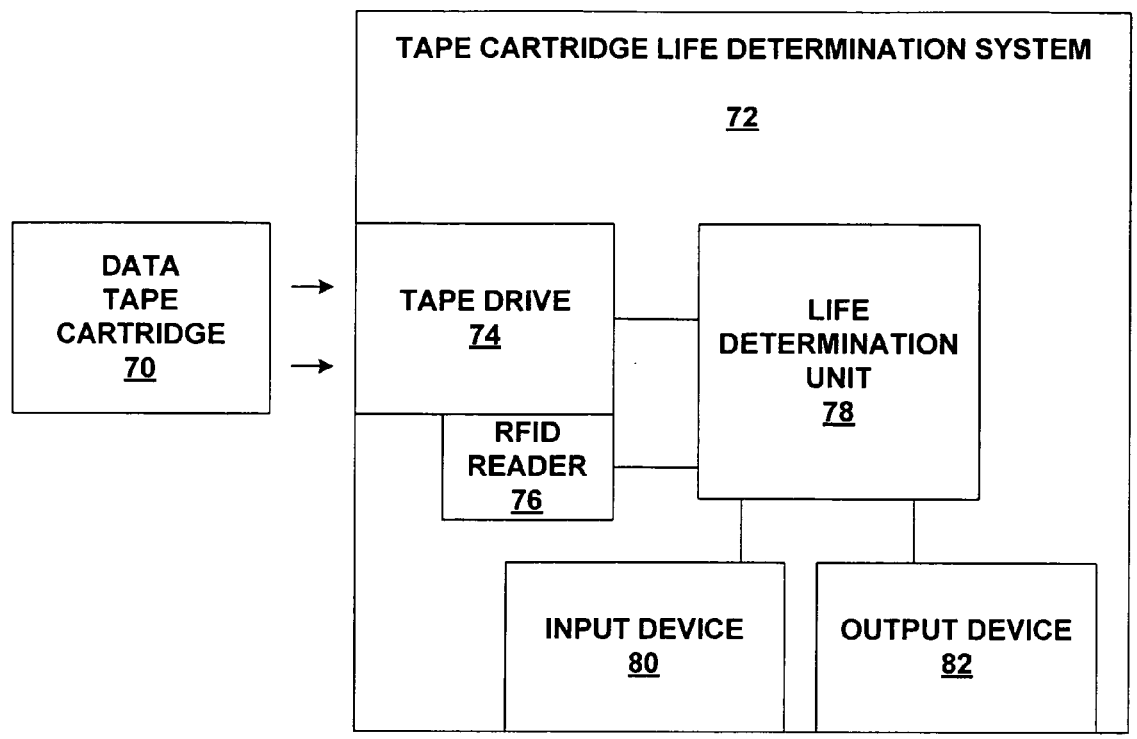
FIG. 7 is a block diagram illustrating an exemplary computer system that may implement one or more aspects of the invention.

In some cases, one or more aspects of the invention may be computer implemented. FIG. 7 illustrates an exemplary computer system that may be used to determine the life information associated with a data tape medium, and thereby facilitate the decision whether to refurbish and/or resell the data tape medium as described herein. As shown, data tape cartridge 70 (which includes a data tape medium) is inserted into a tape drive 74 of tape cartridge life determination system 72. Tape drive 74 reads a tape header of the data tape medium in cartridge 70 in order to identify how much of the life of cartridge 70 has been used. Alternatively or additionally, RFID reader 76 reads an RFID tag in data tape cartridge 70 in order to identify how much of the life of cartridge 70 has been used.

Life determination unit 78 determines the life information associated with cartridge 70, for example, by subtracting the amount of life that has been used from an original manufacture-specified durability value. Life determination unit 78 may maintain a table of durability values associated with different types of cartridges and may select the appropriate entry from the table based on the type associated with cartridge 70. Life determination unit 78 can then compare the life information with a pre-defined threshold in order to determine whether refurbishing or resale are appropriate for data tape cartridge 70.

Input device 80 can allow a user to program the pre-defined threshold, or to change the threshold if desired. Input device 80 may comprise a keyboard, mouse, trackball, or any other device that allows a threshold to be input to system 72. Output device 82 outputs the decision of life determination unit 78 to the user. For example, life determination unit 78 may comprise a display that notifies the user whether data tape cartridge 70 has sufficient remaining life to warrant refurbishment and/or resale. Output device 82 may output the specific amount of remaining life associated with data tape cartridge 70 or may simply output a determination whether the life information associated with data tape cartridge 70 exceeds the predefined threshold.

If desired, the refurbishing techniques may also be automated into system 72. In this case, a degausser (not shown) and an in-drive servo writer (not shown) may be invoked at the direction of life determination unit 78 in order to degauss data tape cartridge 70 and re-write servo patterns. Also, automation techniques may be used to sort tape cartridges into bins. For example, if data tape cartridge 70 is identified as having sufficient life that warrants refurbishing or resale, an automation unit may sort data tape cartridge 70 into a first bin. If, however, data tape cartridge 70 is identified as not having sufficient life for refurbishing or resale, the automation unit may sort data tape cartridge 70 into a second bin. The first bin may store cartridges for refurbishing or resale, whereas the second bin may store cartridges to be discarded. In this case, life determination unit 78 can control the automation unit to cause different cartridges to be stored in the different bins.

A number of embodiments of the invention have been described. For example, refurbishing and resale techniques have been described. Nevertheless, various modifications may be made without departing from the scope of the invention. Accordingly, these and other embodiments are within the scope of the following claims.

The invention claimed is:

1. A method comprising:
    determining life information associated with a data tape medium; and
    reselling the data tape medium when the life information indicates that the data tape medium has a remaining life that is larger than a pre-defined threshold.

2. The method of claim 1, wherein determining the life information comprises reading a header file that includes the life information using a tape drive.

3. The method of claim 1, wherein determining the life information comprises reading a radio frequency identification (RFID) tag within a data tape cartridge of the data tape medium, wherein the RFID tag includes the life information.

4. The method of claim 1, wherein reselling the data tape medium includes marketing the data tape medium as defining a remaining useful life greater than the pre-defined threshold.

5. The method of claim 1, further comprising reselling the data tape medium with a warranty that extends greater than or equal to the pre-defined threshold.

6. The method of claim 1, further comprising determining the pre-defined threshold.

7. The method of claim 1, wherein the pre-defined threshold is approximately 50 percent of an original manufacture specified durability value.

8. The method of claim 1, further comprising refurbishing the data tape medium when the remaining life of the data tape medium is larger than the pre-defined threshold.

9. The method of claim 8, wherein refurbishing the data tape medium comprises:
   degaussing the data tape medium;
   recording a servo pattern on the degaussed data tape medium; and
   verifying the servo pattern, wherein recording the servo pattern on the degaussed data tape medium comprises recording the servo pattern using an in-drive servo recording technique in which a magnetic tape cartridge that includes the data tape medium is inserted into a drive that performs the in-drive servo recording technique.

10. A method comprising:
    determining life information associated with a data tape medium in a data tape cartridge;
    refurbishing the data tape medium when a remaining life of the data tape medium is larger than a pre-defined threshold; and
    reselling the data tape cartridge that includes the refurbished data tape medium.

11. The method of claim 10, wherein refurbishing includes degaussing the data tape medium, recording a servo pattern on the degaussed data tape medium, and verifying the servo pattern.

12. The method of claim 10, wherein determining the life information comprises one of reading a header file that includes the life information and reading a radio frequency identification (RFID) tag within the data tape cartridge that includes the life information.

13. The method of claim 10, wherein reselling the data tape cartridge includes marketing the data tape cartridge as defining a remaining useful life greater than the pre-defined threshold.

14. The method of claim 10, further comprising reselling the data tape cartridge with a warranty that extends an amount of time substantially equal to the pre-defined threshold.

* * * * *